United States Patent
Li

(10) Patent No.: US 9,665,805 B2
(45) Date of Patent: May 30, 2017

(54) DATA PROCESSING METHOD, DATA PROCESSING APPARATUS AND INK-JET PRINTER

(71) Applicants: Peking University Founder Group Co., Ltd., Beijing (CN); Beijing Founder Electronics Co., Ltd., Beijing (CN)

(72) Inventor: Zhenhua Li, Beijing (CN)

(73) Assignees: Peking University Founder Group Co., Ltd., Beijing (CN); Beijing Founder Electronics Co., Ltd., Beijing (CN)

( * ) Notice: Subject to any disclaimer, the term of this patent is extended or adjusted under 35 U.S.C. 154(b) by 0 days.

(21) Appl. No.: 14/759,565

(22) PCT Filed: Nov. 1, 2013

(86) PCT No.: PCT/CN2013/086409
§ 371 (c)(1),
(2) Date: Jul. 7, 2015

(87) PCT Pub. No.: WO2014/106406
PCT Pub. Date: Jul. 10, 2014

(65) Prior Publication Data
US 2015/0363678 A1    Dec. 17, 2015

(30) Foreign Application Priority Data

Jan. 7, 2013  (CN) .......................... 2013 1 0004753

(51) Int. Cl.
*G06K 15/02* (2006.01)
*G06K 15/10* (2006.01)
*G06F 3/12* (2006.01)

(52) U.S. Cl.
CPC ......... *G06K 15/1809* (2013.01); *G06F 3/122* (2013.01); *G06F 3/1215* (2013.01);
(Continued)

(58) Field of Classification Search
None
See application file for complete search history.

(56) References Cited

U.S. PATENT DOCUMENTS

| 2008/0036801 | A1 | 2/2008 | Mihara | |
| 2009/0015616 | A1* | 1/2009 | Miyamoto | B41J 2/2139 347/14 |
| 2011/0037801 | A1* | 2/2011 | Akiba | G06K 15/102 347/14 |

FOREIGN PATENT DOCUMENTS

| CN | 1353399 | 6/2002 |
| CN | 101383009 | 3/2009 |

(Continued)

OTHER PUBLICATIONS

Notice of Reasons for Rejection, mailed Dec. 6, 2016 for JP 2015-551105.

*Primary Examiner* — Nicholas Pachol
*Assistant Examiner* — Pawandeep Dhingra
(74) *Attorney, Agent, or Firm* — Brinks Gilson & Lione

(57) ABSTRACT

Disclosed are a data processing method, an apparatus and an ink-jet printer. A method comprises a processor sequentially receiving multiple lines of image lattice data; after receiving one line of image lattice data splitting one line of image lattice data to n groups of image lattice data according to number of lines of corresponding nozzles along a paper feeding direction of the one line of image lattice data, wherein n is number of rows of all nozzles; writing corresponding split n groups of image lattice data to an internal buffer; writing n groups of image lattice data in corresponding internal buffer to an external storage; reading data from (Continued)

external storage embodiments of the present invention reduce processing cost of the image lattice data, and improve image lattice processing speed.

7 Claims, 3 Drawing Sheets

(52) U.S. Cl.
CPC .......... *G06F 3/1254* (2013.01); *G06F 3/1296* (2013.01); *G06K 15/102* (2013.01); *G06K 15/107* (2013.01); *G06K 15/1817* (2013.01)

(56) References Cited

FOREIGN PATENT DOCUMENTS

| | | |
|---|---|---|
| CN | 102117416 | 7/2011 |
| CN | 102458860 | 5/2012 |
| JP | 63264365 | 11/1988 |
| JP | 2008/0036801 A1 | 2/2008 |
| TW | 429219 | 4/2001 |

\* cited by examiner

DATA PROCESSING METHOD, DATA PROCESSING APPARATUS AND INK-JET PRINTER

CROSS-REFERENCE TO RELATED APPLICATIONS

The present application is a 371 national stage application of PCT International Application No. PCT/CN2013/086409, filed Nov. 1, 2013, which application claims a right of priority to Chinese Patent Application No. 201310004753.5, filed Jan. 7, 2013, both of which are incorporated herein by reference in their entirety.

TECHNICAL FIELD

The present invention relates to a field of computer printing application technology, and more specifically, to a data processing method, an apparatus and an ink-jet printer.

BACKGROUND

As the ink-jet printing technology develops, the market has imposed higher requirements on the accuracy of an ink-jet printed article. This requires the nozzle manufacturer to improve the print accuracy of nozzles. The print accuracy may be described by DPI (Dots Per Inch). Due to the limitation of the nozzle fabrication technology, the distance between nozzles can not be too small. Therefore, many nozzle manufacturers employ multiple rows of nozzles for splicing. In this way, the DPI of its projection on a direction vertical to the paper feeding direction is increased, thereby improving the print accuracy. However, this splicing method also brings a big problem for data processing, i.e. it is necessary to perform a split-delay processing on image lattice data according to an order of the nozzles so that the image is presented on a medium correctly.

If a software is used to perform the split-delay processing on lattice data of an image according to the order of the nozzles, the data split-delay processing may be achieved at a low cost by means of strong computation and huge memory resources of the computer. However, since the processing procedure involves a large amount of bit operations, it will greatly reduce the image processing speed, thereby reducing the print speed, which does not satisfy the current high speed print demand.

If hardware (e.g. a programmable logic device) is used to perform split-delay processing on lattice data of an image according to the order of the nozzles, it is possible to utilize the programmable logic device's advantage for bit operations. However, the operation of the split-delay processing needs a large amount of internal memories, and the cost thereof will be considerably increased.

Therefore, it can be seen that the above mentioned processing methods have a problem of a low print speed or a high cost.

SUMMARY

An embodiment of the present invention provides a data processing method, an apparatus and an ink-jet printer for solving the problem of a low print speed or a high cost that exists in the prior art.

A data processing method provided by an embodiment of the present invention comprises the following steps:

Step S1: a processor sequentially receives multiple lines of image lattice data; after receiving one line of image lattice data, splits the one line of image lattice data to n groups of image lattice data according to a number of rows of nozzles corresponding to the one line of image lattice data along a paper feeding direction, wherein n is the number of rows of all nozzles;

Step S2: after splitting the one line of image lattice data, the processor writes the corresponding split n groups of image lattice data to an internal buffer;

Step S3: after writing the split n groups of image lattice data corresponding to the one line of image lattice data to the internal buffer, the processor writes the n groups of image lattice data in the corresponding internal buffer to an external storage;

Step S4: the processor reads data from the external storage according to an arrangement of all nozzles and controls the nozzles according to the read data.

Specifically, said step S3 specifically comprises the following steps: after writing the split n groups of image lattice data corresponding to the one line of image lattice data to the internal buffer, the processor writes the n groups of image lattice data in the corresponding internal buffer to n corresponding regions of the external storage.

Specifically, said step S4 comprises the following steps:

when $P_i \leq j < P_{i+1}$ (j is Y axis coordinate of the front edge of the ink-jetted portion of the paper) and $1 \leq i \leq n-1$ the processor reads the $(j-P_k+P_1)$th line of image lattice data corresponding to the kth row of nozzles in the paper feeding direction from the external storage and sends the read data to the kth row of nozzles, where k is in the range of 1 to i;

when $j \geq P_n$, the processor reads the $(j-P_s+P_1)$th line of image lattice data corresponding to the sth row of nozzles in the paper feeding direction from the external storage, and sends the read data to the sth row of nozzles, where s is in the range of 1 to n, wherein the paper feeding direction is taken as the Y axis, and the Y axis coordinates corresponding to the $1^{st}$ to nth row of nozzles row are $P_1$ to $P_n$, respectively.

Furthermore, the method further comprises the following step: after receiving data sent by the processor, said nozzles perform ink-jetting according to the received data.

A data processing apparatus provided by an embodiment of the present invention comprises a processor, an internal buffer, an external storage and nozzles, wherein the processor is configured to sequentially receive multiple lines of image lattice data; after receiving one line of image lattice data, split the one line of image lattice data to n groups of image lattice data according to the number of rows of nozzles corresponding to the one line of image lattice data along a paper feeding direction of the one line of image lattice data, wherein n is the number of rows of all nozzles; after splitting the one line of image lattice data, write the corresponding split n groups of image lattice data to an internal buffer; after writing the split n groups of image lattice data corresponding to the one line of image lattice data to the internal buffer, write the n groups of image lattice data in the corresponding internal buffer to an external storage; read data from the external storage according to an arrangement of all nozzles and control the nozzles according to the read data;

the internal buffer is configured to store the n groups of image lattice data obtained after splitting the one line of image lattice data sent by the processor;

the external storage is configured to store the n groups of image lattice data obtained after splitting the one line of image lattice data sent by the processor;

the nozzles are configured to, under the control of the processor, perform ink-jetting according to the data read by the processor.

Specifically, said processor is configured to perform the following steps:

when $P_i \leq j < P_{i+1}$ (j is Y axis coordinate of the front edge of the ink-jetted portion of the paper) and $1 \leq i \leq n-1$, the processor reads the $(j-P_k+P_1)$th line of image lattice data corresponding to the kth row of nozzles in the paper feeding direction from the external storage and sends the read data to the kth row of nozzles, where k is in the range of 1 to i;

when $j \geq P_n$, the processor reads the $(j-P_s+P_1)$th line of image lattice data corresponding to the sth row of nozzles in the paper feeding direction from the external storage, and sends the read data to the sth row of nozzles, where s is in the range of 1 to n, wherein the paper feeding direction is taken as the Y axis, and the Y axis coordinates corresponding to the $1^{st}$ to nth row of nozzles row are $P_1$ to $P_n$, respectively.

Specifically, said step S3 specifically comprises the following steps: after writing the split n groups of image lattice data corresponding to the one line of image lattice data to the internal buffer, the processor writes the n groups of image lattice data in the corresponding internal buffer to n corresponding regions of the external storage.

Furthermore, said nozzles are further configured to, after receiving data sent from the processor, perform ink-jetting according to the received data.

An embodiment of the present invention provides an ink-jet printer which comprises any of the above mentioned data processing apparatus.

The advantageous effect of the present invention is as follows: by cooperatively using the processor and the external storage, embodiments of the present invention achieve reduction in the cost of the split-delay processing of image lattice data and improvement of the speed of the split-delay processing of image lattice data.

DETAILED DESCRIPTION

Embodiments of the present invention combines a processor, an external storage and an internal buffer, avoids a problem of a low speed caused by using software and avoids a problem of a high cost caused by using a programmable logic device.

Hereinafter, embodiments of the present invention are further explained in conjunction with the attached drawings.

Figure 1:
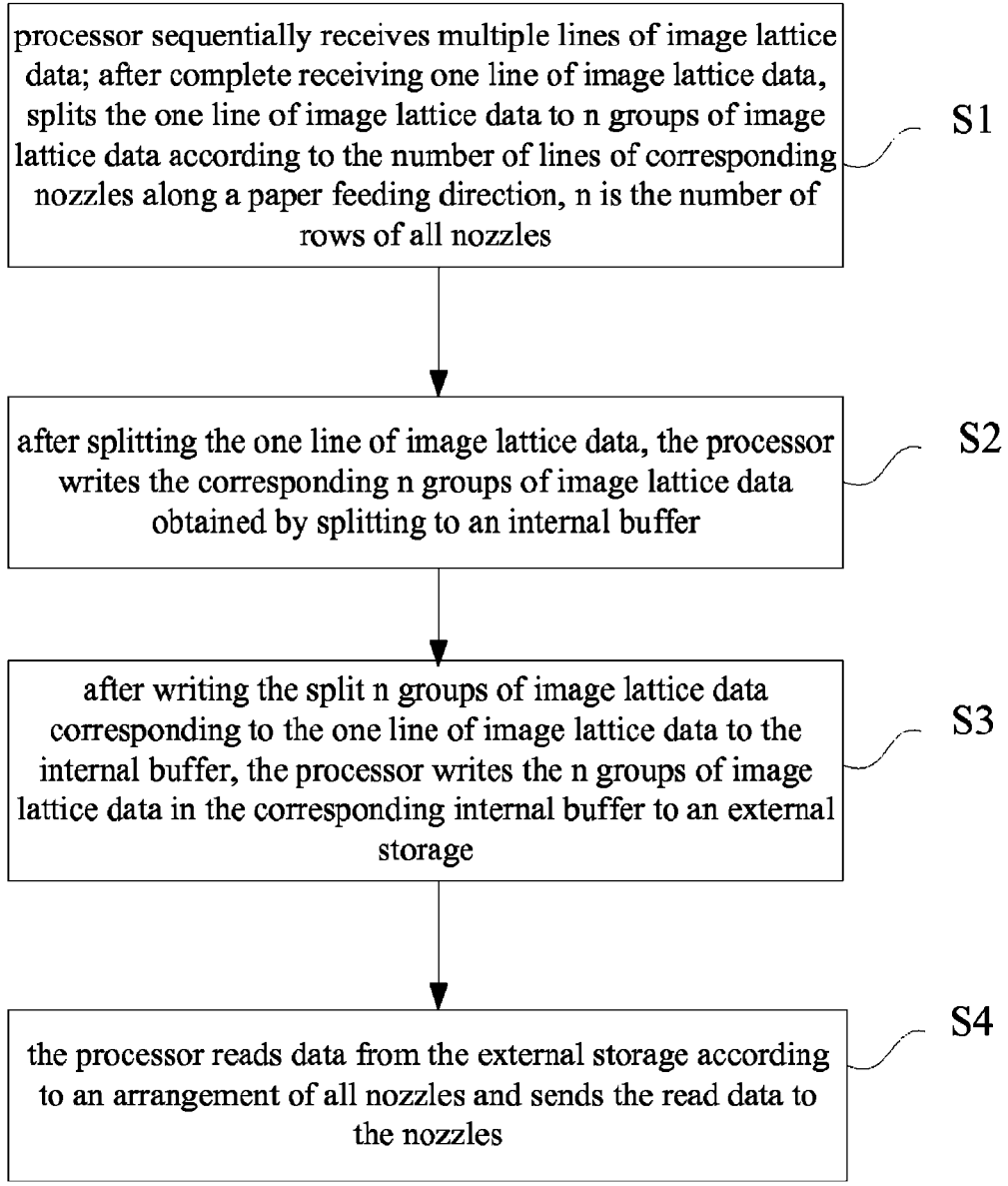
FIG. 1 is a flowchart of a data processing method in an embodiment of the present invention.

As shown in FIG. 1, a data processing method includes the following steps:

Step S1: a processor sequentially receives multiple lines of image lattice data; after receiving one line of image lattice data, splits the one line of image lattice data to n groups of image lattice data according to a number of rows of nozzles corresponding to the one line of image lattice data along a paper feeding direction, wherein n is the number of rows of all nozzles; the use of the processor improves the splitting speed of image lattice data.

Step S2: after splitting the one line of image lattice data, the processor writes the corresponding split n groups of image lattice data to an internal buffer;

Step S3: after writing the split n groups of image lattice data corresponding to the one line of image lattice data to the internal buffer, the processor writes the n groups of image lattice data in the corresponding internal buffer to an external storage; here, the use of the external storage rather than a programmable logic device reduces the cost of the split-delay processing of image lattice data;

Step S3 specifically includes the following steps: after writing the split n groups of image lattice data corresponding to the one line of image lattice data to the internal buffer, the processor writes the n groups of image lattice data in the corresponding internal buffer to n corresponding regions of the external storage.

Step S4: the processor reads data from the external storage according to an arrangement of all nozzles and controls the nozzles according to the read data.

Figure 2:
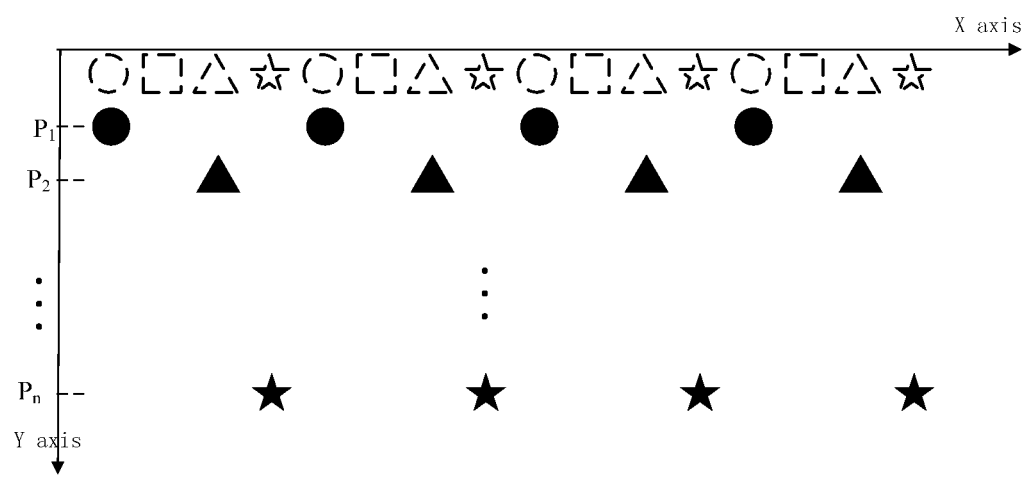
FIG. 2 is a schematic diagram of the nozzle arrangement in an embodiment of the present invention.

Step S4 specifically includes the following steps:

As shown in FIG. 2, the paper feeding direction is taken as the Y axis, and the Y axis coordinates corresponding to the $1^{st}$ to nth row of nozzles row are $P_1$ to $P_n$, respectively;

when $P_i \leq j < P_{i+1}$ (j is Y axis coordinate of the front edge of the ink-jetted portion of the paper) and $1 \leq i \leq n-1$, the processor reads the $(j-P_k+P_1)$th line of image lattice data corresponding to the kth row of nozzles in the paper feeding direction from the external storage and sends the read data to the kth row of nozzles, where k is in the range of 1 to i;

when $j \geq P_n$, the processor reads the $(j-P_s+P_1)$th line of image lattice data corresponding to the sth row of nozzles in the paper feeding direction from the external storage, and sends the read data to the sth row of nozzles, where s is in the range of 1 to n, Further, after reading data from the external storage, the processor controls the nozzles to perform ink-jetting according to the read data.

Figure 3:
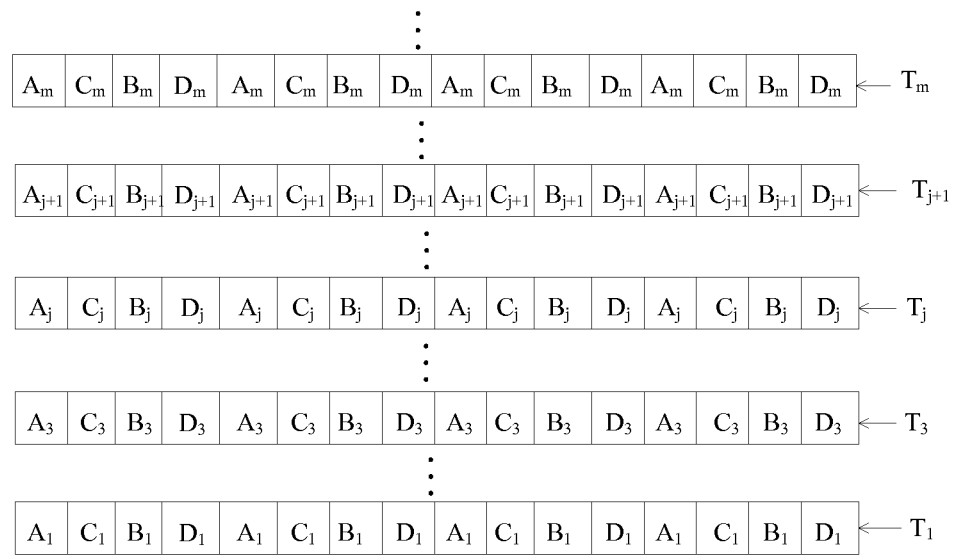
FIG. 3 is a schematic diagram of a kind of arrangement of 4 rows of nozzles and the splitting of multiple lines of image lattice data.

Specifically, a schematic diagram of a kind of arrangement of 4 rows of nozzles and splitting of multiple lines of image lattice data is as shown in FIG. 3. In FIG. 3, Y direction is the paper feeding direction, X direction is vertical to the Y direction, the 4 rows of nozzles are denoted by solid circles, solid triangles, solid squares, solid five pointed stars, respectively. Their coordinates in the Y axis are 1, 3, 5, 7 respectively. The DPI of the 4 rows of nozzles is 4 times that of a single row of nozzles. Therefore, it can be seen that the DPI of the nozzles is increased. However, the second row of nozzles (denoted by the solid triangle pattern) need to be delayed by 2 lines to print relative to the first row of nozzles (denoted by the solid circle pattern); the third row of nozzles (denoted by the solid square pattern) need to be delayed by 4 lines to print relative to the first row of nozzles (denoted by the solid circle pattern); the fourth row of nozzles (denoted by the solid five pointed star pattern) need to be delayed by 6 lines to print relative to the first row of nozzles (denoted by the solid circle pattern).

The processor sequentially receives multiple lines of image lattice data (sequentially receives the $1^{st}$ line of image data $T_1$ to the mth line of image lattice data $T_m$, m>1).

After complete receiving one line of image lattice data, the processor splits the one line of image lattice data to 4 groups of image lattice data according to the number of rows of corresponding nozzles along the paper feeding direction.

As shown in FIG. 3, the mth line of image lattice data $T_m$ is split to an $A_m$ group data, a $B_m$ group data, a $C_m$ group data and a $D_m$ group data; the $A_m$ group data indicates the data in the mth line of image lattice data $T_m$ corresponding to the $1^{st}$ row of nozzles in the Y direction, the $B_m$ group data indicates the data in the mth line of image lattice data $T_m$ corresponding to the $2^{nd}$ row of nozzles in the Y direction, the $C_m$ group data indicates the data in the mth line of image lattice data $T_m$ corresponding to the $3^{rd}$ row of nozzles in the Y direction, the $D_m$ group data indicates the data in the mth line of image lattice data $T_m$ corresponding to the 4th row of nozzles in the Y direction.

After splitting one line of image lattice data, the processor writes the corresponding 4 groups of image lattice data obtained by splitting to the internal buffer. For example, after the mth line of image lattice data $T_m$ is split, the $A_m$ group data, the $B_m$ group data, the $C_m$ group data and the $D_m$ group data obtained by splitting are written to the internal buffer.

After writing the n groups of image lattice data obtained by splitting corresponding to the one line of image lattice data to the internal buffer, the processor writes the n groups of image lattice data in the corresponding internal buffer to the external storage. For example, the $A_m$ group data, the $B_m$ group data, the $C_m$ group data and the $D_m$ group data obtained by splitting are correspondingly written to a region, b region, c region and d region of the external storage.

The specific process of the processor reading data from the external storage according to the arrangement of all nozzles is as follows:

Performing ink-jetting for the $1^{st}$ time: the processor reads $A_1$ group data from the a region of the external storage. The b region, the c region and the d region of the external storage do not need to be read, and their corresponding nozzle data positions are filled with null data. Thus, one line of data that is finally formed is used to control corresponding nozzles, the processor controls the $1^{st}$ row of nozzles to perform ink-jetting according to the read $A_1$ group data.

Performing ink-jetting for the $2^{nd}$ time: the processor reads $A_2$ group data from the a region of the external storage. The b region, the c region and the d region of the external storage do not need to be read, and their corresponding nozzle data positions are filled with null data. Thus, one line of data that is finally formed is used to control corresponding nozzles. The processor controls the $1^{st}$ row of nozzles to perform ink-jetting according to the read $A_2$ group data.

Performing ink-jetting for the $3^{rd}$ time: the processor reads $A_3$ group data from the a region of the external storage, reads $B_1$ group data from the b region of the external storage. The c region and the d region of the external storage do not need to be read, and their corresponding nozzle data positions are filled with null data. Thus, one line of data that is finally formed is used to control corresponding nozzles. The processor controls the $1^{st}$ row of nozzles to perform ink-jetting according to the read $A_3$ group data, and controls the $2^{nd}$ row of nozzles to perform ink-jetting according to the read $B_1$ group data. Therefore, it can be seen that data for printing by the $2^{nd}$ row of nozzles are delayed by 2 lines to operate relative to the $1^{st}$ row of nozzles.

Performing ink-jetting for the $4^{th}$ time: the processor reads $A_4$ group data from the a region of the external storage, reads a $B_2$ group data from the b region of the external storage. The c region and the d region of the external storage do not need to be read, and their corresponding nozzle data positions are filled with null data. Thus, one line of data that is finally formed is used to control corresponding nozzles. The processor controls the $1^{st}$ row of nozzles to perform ink-jetting according to the read $A_4$ group data, and controls the $2^{nd}$ row of nozzles to perform ink-jetting according to the read $B_2$ group data.

Performing ink-jetting for the $5^{th}$ time: the processor reads $A_5$ group data from the a region of the external storage, reads $B_3$ group data from the b region of the external storage, reads $C_1$ group of data from the c region of the external storage. The d region of the external storage does not need to be read, and its corresponding nozzle data positions are filled with null data, one line of data that is finally formed is used to control corresponding nozzles. The processor controls the $1^{st}$ row of nozzles to perform ink-jetting according to the read $A_5$ group data, controls the $2^{nd}$ row of nozzles to perform ink-jetting according to the read $B_3$ group data, and controls the $3^{rd}$ row of nozzles to perform ink-jetting according to the read $C_1$ group data. Therefore, it can be seen that data for printing by the $3^{rd}$ row of nozzles are delayed by 4 lines to operate relative to the $1^{st}$ row of nozzles.

Performing ink-jetting for the $6^{th}$ time: the processor reads $A_6$ group data from the a region of the external storage, reads $B_4$ group data from the b region of the external storage, reads $C_2$ group data from the c region of the external storage. The d region of the external storage does not need to be read, and its corresponding nozzle data positions are filled with null data. Thus, one line of data that is finally formed is used to control corresponding nozzles. The processor controls the $1^{st}$ row of nozzles to perform ink-jetting according to the read $A_6$ group data, controls the $2^{nd}$ row of nozzles to perform ink-jetting according to the read $B_4$ group data, and controls the $3^{rd}$ row of nozzles to perform ink-jetting according to the read $C_2$ group data.

Performing ink-jetting for the $7^{th}$ time: the processor reads $A_7$ group data from the a region of the external storage, reads $B_5$ group data from the b region of the external storage, reads $C_3$ group data from the c region of the external storage, reads $D_1$ group data from the d region of the external storage. Thus, one line of data that is finally formed is used to control corresponding nozzles. The processor controls the $1^{st}$ row of nozzles to perform ink-jetting according to the read $A_7$ group data, controls the $2^{nd}$ row of nozzles to perform ink-jetting according to the read $B_5$ group data, controls the $3^{rd}$ row of nozzles to perform ink-jetting according to the read $C_3$ group data, and controls the $4^{th}$ row of nozzles to perform ink-jetting according to the read $D_1$ group data. Therefore, it can be seen that data for printing by the $4^{th}$ row of nozzles are delayed by 6 lines to operate relative to the $1^{st}$ row of nozzles.

Performing ink-jetting for the $j^{th}$ time (j>7): the processor reads $A_j$ group data from the a region of the external storage, reads $B_{j-2}$ group data from the b region of the external storage, reads $C_{j-4}$ group data from the c region of the external storage, reads $D_{j-6}$ group data from the d region of the external storage. Thus, one line of data that is finally formed is used to control the $1^{st}$, $2^{nd}$, $3^{rd}$ and $4^{th}$ rows of the nozzles. The processor controls the $1^{st}$ row of nozzles to perform ink-jetting according to the read $A_j$ group data, controls the $2^{nd}$ row of nozzles to perform ink-jetting according to the read $B_{j-2}$ group data, controls the $3^{rd}$ row of nozzles to perform ink-jetting according to the read $C_{j-4}$ group data, and controls the $4^{th}$ row of nozzles to perform ink-jetting according to the read $D_{j-6}$ group data.

Figure 4:
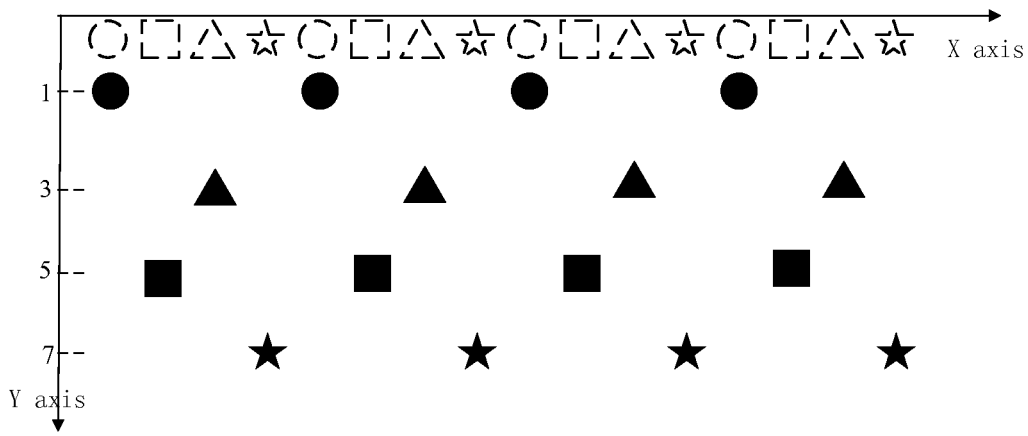
FIG. 4 is a schematic diagram of a data processing apparatus according to an embodiment of the present invention.

As shown in FIG. 4, a data processing apparatus is constructed according to the data processing method provided by the embodiment of the present invention, the apparatus includes a processor, an internal buffer, an external storage and nozzles, wherein the processor is configured to sequentially receive multiple lines of image lattice data; after receiving one line of image lattice data, split the one line of image lattice data to n groups of image lattice data according to the number of rows of nozzles corresponding to the one line of image lattice data along a paper feeding direction of the one line of image lattice data, wherein n is the number of rows of all nozzles; after splitting the one line of image lattice data, write the corresponding split n groups of image lattice data to an internal buffer; after writing the split n groups of image lattice data corresponding to the one line of image lattice data to the internal buffer, write the n groups of image lattice data in the corresponding internal buffer to an external storage; read data from the external storage according to an arrangement of all nozzles and control the nozzles according to the read data;

the internal buffer is configured to store the n groups of image lattice data obtained after splitting the one line of image lattice data sent by the processor;

the external storage is configured to store the n groups of image lattice data obtained after splitting the one line of image lattice data sent by the processor;

the nozzles are configured to, under the control of the processor, perform ink-jetting according to the data read by the processor.

The implementation of the data processing apparatus is the same as the method embodiment, and it is not repeated any more.

An embodiment of the present invention also provides an ink-jet printer, the ink-jet printer is built in with the data processing apparatus provided by the embodiment of the present invention therein.

Obviously, those skilled in the art should understand that the above mentioned respective modules or respective steps of the present invention may be implemented with a general purpose computing apparatus, they may be concentrated on a single computing apparatus, or may be distributed over a network constituted by a plurality of computing apparatuses. Optionally, they may be implemented with a program code executable by the computing apparatus such that they may be stored in a storage apparatus to be executed by the computing apparatus, or they may be respectively manufactured as respective integrated circuit modules, or multiple modules or steps among them may be manufactured as a single integrated circuit module. In this way, the present invention is not limited to any specific combination of hardware and software.

Obviously, those skilled in the art may make any modification and variation to the invention without departing from the spirit and scope of the invention. Therefore, if these modifications and variations of the invention are within the scope of the claims of the invention and equivalent thereof, the invention is also intended to cover these modifications and variations.

What is claimed is:

1. A data processing method, comprising:
   sequentially receiving, by a processor, multiple lines of image lattice data; after receiving one line of image lattice data, splitting the one line of image lattice data to n groups of image lattice data according to a number of rows of nozzles corresponding to the one line of image lattice data along a paper feeding direction, wherein n is the number of rows of all nozzles;
   after splitting the one line of image lattice data, writing, by the processor, the corresponding split n groups of image lattice data to an internal buffer;
   after writing the split n groups of image lattice data corresponding to the one line of image lattice data to the internal buffer, writing, by the processor, the n groups of image lattice data in the corresponding internal buffer to an external storage;
   reading, by the processor, data from the external storage according to an arrangement of all nozzles and controlling the nozzles according to the read data;
   wherein the step of reading data from the external storage according to an arrangement of all nozzles and controlling the nozzles according to the read data further comprises
   when $P_i \leq i < P_{i+1}$ (i is Y axis coordinate of the front edge of the ink-jetted portion of the paper and $1 \leq i \leq n-1$, reading, by the processor, the $(j-P_k+P_1)$th line of image lattice data corresponding to the kth row of nozzles in the paper feeding direction from the external storage and sending the read data to the kth row of nozzles, where k is in the range of 1 to i;
   when $j \geq P_n$, reading, by the processor, the $(j-P_s+P_1)$th line of image lattice data corresponding to the sth row of nozzles in the paper feeding direction from the external storage, and sending the read data to the sth row of nozzles, where s is in the range of 1 to n,
   wherein the paper feeding direction is taken as the Y axis, and the Y axis coordinates corresponding to the $1^{st}$ to nth row of nozzles row are $P_1$ to $P_n$, respectively.

2. The method according to claim 1, wherein the step of writing the n groups of image lattice data in the corresponding internal buffer to the external storage further comprises
   after writing the split n groups of image lattice data corresponding to the one line of image lattice data to the internal buffer, writing, by the processor, the n groups of image lattice data in the corresponding internal buffer to n corresponding regions of the external storage.

3. The method according to claim 1, further comprising
   after reading data from the external storage, controlling, by the processor, the nozzles to perform ink-jetting according to the read data.

4. A data processing apparatus, characterized in that the data processing apparatus comprises a processor, an internal buffer, an external storage and nozzles, wherein
   the processor is configured to sequentially receive multiple lines of image lattice data; after receiving one line of image lattice data, split the one line of image lattice data to n groups of image lattice data according to the number of rows of nozzles corresponding to the one line of image lattice data along a paper feeding direction of the one line of image lattice data, wherein n is the number of rows of all nozzles; after splitting the one line of image lattice data, write the corresponding split n groups of image lattice data to an internal buffer; after writing the split n groups of image lattice data corresponding to the one line of image lattice data to the internal buffer, write the n groups of image lattice data in the corresponding internal buffer to an external storage; read data from the external storage according to an arrangement of all nozzles and control the nozzles according to the read data;
   the internal buffer is configured to store the n groups of image lattice data obtained after splitting the one line of image lattice data sent by the processor;
   the external storage is configured to store the n groups of image lattice data obtained after splitting the one line of image lattice data sent by the processor;

the nozzles are configured to, under the control of the processor, perform ink-jetting according to the data read by the processor;

wherein said processor is further configured to when $P_i \leq j < P_{i+1}$ (j is Y axis coordinate of the front edge of the ink-jetted portion of the paper) and $1 \leq i \leq n-1$, read the $(j-P_k+P_1)$th line of image lattice data corresponding to the kth row of nozzles in the paper feeding direction from the external storage and sends the read data to the kth row of nozzles, where k is in the range of 1 to i;

when $j \geq P_n$, read the $(j-P_s+P_1)$th line of image lattice data corresponding to the sth row of nozzles in the paper feeding direction from the external storage, and sends the read data to the sth row of nozzles, where s is in the range of 1 to n, wherein the paper feeding direction is taken as the Y axis, and the Y axis coordinates corresponding to the $1^{st}$ to nth row of nozzles row are $P_1$ to $P_n$, respectively.

5. The apparatus according to claim 4, wherein said processor is further configured to, after writing the split n groups of image lattice data corresponding to the one line of image lattice data to the internal buffer, write the n groups of image lattice data in the corresponding internal buffer to n corresponding regions of the external storage.

6. An ink-jet printer, characterized in that the ink-jet printer comprises the apparatus according to claim 4.

7. A non-transitory computer readable medium with a computer program stored thereon, when the computer program is executed in a computer, cause a processor of the computer to perform the following processing:

sequentially receiving multiple lines of image lattice data;

after receiving one line of image lattice data, splitting the one line of image lattice data to n groups of image lattice data according to a number of rows of nozzles corresponding to the one line of image lattice data along a paper feeding direction, wherein n is the number of rows of all nozzles;

after splitting the one line of image lattice data, writing the corresponding split n groups of image lattice data to an internal buffer;

after writing the split n groups of image lattice data corresponding to the one line of image lattice data to the internal buffer, writing the n groups of image lattice data in the corresponding internal buffer to an external storage;

reading data from the external storage according to an arrangement of all nozzles and controlling the nozzles according to the read data;

wherein the step of reading data from the external storage according to an arrangement of all nozzles and controlling the nozzles according to the read data further comprises when $P_i \leq i \leq P_{i+1}$ (j is Y axis coordinate of the front edge of the ink-jetted portion of the paper) and $1 \leq i \leq n-1$, reading the $(j-P_k+P_1)$th line of image lattice data corresponding to the kth row of nozzles in the paper feeding direction from the external storage and sending the read data to the kth row of nozzles, where k is in the range of 1 to i;

when $j \geq P_n$, reading the $(j-P_s+P_1)$th line of image lattice data corresponding to the sth row of nozzles in the paper feeding direction from the external storage, and sending the read data to the sth row of nozzles, where s is in the range of 1 to n, wherein the paper feeding direction is taken as the Y axis, and the Y axis coordinates corresponding to the $1^{st}$ to nth row of nozzles row are $P_1$ to $P_n$, respectively.

* * * * *